United States Patent Office 3,452,269
Patented June 24, 1969

3,452,269
METHODS AND APPARATUS FOR INVESTIGATING EARTH FORMATIONS INCLUDING ADJUSTING THE POTENTIAL DISTRIBUTION IN AN AXIAL DIRECTION THROUGH A BOREHOLE
Wilbur C. Welz, Houston, Tex., assignor, by mesne assignments, to Schlumberger Technology Corporation, Houston, Tex., a corporation of Texas
Continuation of application Ser. No. 457,705, May 21, 1965. This application July 15, 1968, Ser. No. 749,242
Int. Cl. G01v 1/02
U.S. Cl. 324—10                                    29 Claims

ABSTRACT OF THE DISCLOSURE

In accordance with an illustrative embodiment of the invention, techniques are shown for maintaining a potential reference electrode at a substantially fixed reference potential and setting up a potential approximating zero volt on opposite sides of focused electrode array. More particularly, the potential gradient in the vicinity of the potential reference electrode is measured and the potential on a pair of shield electrodes located on opposite sides of the focused electrode array is adjusted in response to the measured potential gradient to substantially eliminate current flow in the vicinity of the potential reference electrode. By so doing, the potential of the potential reference electrode remains at substantially zero potential and the shield electrodes are also maintained near zero potential. Means for producing an overfocused effect are also shown in combination with the above.

---

This application is a continuation of application Ser. No. 457,705, May 21, 1965.

This invention relates to electrical methods and apparatus for investigating subsurface earth formations traversed by a borehole and, more particularly, to such apparatus of a type utilizing current emitting electrodes which are lowered into the borehole for passing electrical current into the subsurface formations for obtaining indications of the resistivity or conductivity characteristics thereof.

One manner in which subsurface earth formations are investigated is by obtaining electrical resistivity or conductivity logs by so-called "focused" measurements. These focused measurements are obtained by automatically controlling the potential and current distribution in the vicinity of an electrical logging array as it is passed through the borehole so as to obtain desired current flow patterns. In a focused system, a survey current is emitted by a principal survey current emitting electrode disposed in the borehole and this survey current is confined to a path substantially perpendicular to the borehole axis by focusing currents emitted from nearby focusing electrodes located on opposite sides of the principal electrode and comprising a focusing electrode array.

When investigating subsurface earth formations by obtaining electrical resistivity or conductivity measurements, either the voltage is maintained constant and the current variations measured, or the current is maintained constant and the voltage variations measured, or a combination of the two. Whichever one of these methods is utilized, it is desirable to have a constant errorless reference voltage in the downhole electrical circuitry, so that whichever parameter is to be maintained constant will, in fact, be constant, and the variations in the other parameter may be accurately determined. This reference voltage is obtained with respect to a remote potential reference point, which point should be free of any induced voltage either from currents flowing in the ground from other electrodes in the system, or from any other source such as cable capacity or mutual inductance between cable conductors in the cable which is used to lower the electrode system into the borehole.

If the remote potential reference electrode is placed below the remaining electrodes of the investigating system, there will be substantially no induced voltage in the wires connecting the remote potential reference point with the downhole electrical circuitry from the effects of cable capacity or mutual inductance between cable conductors, since the cable conductors are connected to the opposite or upper side of the downhole electrical circuitry. However, there still may be a potential gradient set up around the remote potential reference electrode by the other electrodes of the investigating system.

In "focused" type systems, it is sometimes desirable to have the focusing electrode array, which is on either side of the survey electrode to extend outwardly in an axial direction through the borehole from both sides of the survey electrode as far as possible so that the survey current beam emitted from the survey electrode will extend outwardly in a direction perpendicular to the borehole axis, for as far a distance as possible. However, there are practical limits, mechanically speaking, to the lengths in both axial directions through the borehole which the focusing electrode array can extend outwardly from the survey electrode. Thus, it is desirable to have the focusing electrode array extend outwardly away from the survey electrode in both axial directions for as short a distance as possible, mechanically, and for a great distance electrically.

At the same time, however, it is desirable to accurately ascertain the exact portion of the earth formations surrounding the borehole through which the survey current beam is traveling and the length from the survey electrode in a direction perpendicular to the borehole axis at which the survey current beam begins diverging back to a current return electrode in the borehole. To accomplish this, the electrical lengths of the focusing electrode array in both axial directions through the borehole from the survey electrode must be constant at every point of investigation throughout the borehole, or otherwise the electrical resistivity or conductivity measurements may be in error. Under certain borehole conditions, however, as for example when the resistivity of the subsurface earth formation surrounding the borehole is much greater than the resistivity of the mud in the borehole, a substantial portion of the focusing current emitted from the focusing electrodes of the focusing electrode array will travel in both axial directions through the borehole, thus setting up a potential approximating the potential on the focusing electrodes for a great distance in both axial directions through the borehole on both sides of the survey electrode. This has the effect of extending the electrical lengths of the focusing electrode array through the borehole in both axial directions from the survey electrode, which in effect, will cause the survey current beam emitted from the survey electrode to extend outwardly perpendicular to the borehole for a distance greater than normal, thus affecting the accuracy of the resistivity or conductivity readings.

It is desirable to solve the aforementioned problems with a minimum of downhole circuitry and, if possible, to solve more than one of the aforementioned problems with the same apparatus.

It is an object of the invention, therefore, to provide new and improved methods and apparatus for measuring the electrical resistance properties of earth formations adjacent to a borehole.

It is another object of the invention to provide new and improved borehole investigating methods and apparatus for maintaining the potential reference electrode at a substantially fixed reference potential in response to the potential gradient in the vicinity of the potential reference electrode.

It is still another object of the invention to provide new and improved borehole investigating methods and apparatus of the "focused" type in which the effective electrical lengths of the focusing electrode array are maintained within a maximum fixed distance from the survey electrode in both axial directions therefrom.

It is still a further object of the invention to provide new and improved borehole investigating methods and apparatus of the "focused" type, in which the effective electrical lengths of the focusing electrode array is extended outwardly in both axial directions through the borehole from the survey electrode up to a maximum fixed distance from the survey electrode, while at the same time, the mechanical length of the focusing electrode array in both axial directions from the survey electrode is kept at a minimum.

It is a still further object of the invention to provide new and improved borehole investigating methods and apparatus of the "focused" type, in which the effective electrical lengths of the focusing electrode array are maintained within a fixed distance from the survey electrode in both directions therefrom and, at the same time, the remote potential reference electrode is maintained substantially free from voltage grdients set up by the investigating equipment.

It is a still further object of the invention to provide new and improved borehole investigating methods and apparatus of the "focused" type in which the same apparatus is utilized to maintain the effective electrical lengths of the focusing electrode array within a fixed distance from the survey electrode in both axial directions therefrom and the voltage gradient set up by the investigating equipment around the remote potential reference electrode is maintained at a substantially zero value.

In accordance with one feature of the invention, methods and apparatus for investigating earth formations comprises a plurality of electrodes adapted for movement through the borehole, the electrodes including an electrode array having at least one electrode adapted to emit current into the surrounding earth formations and a potential monitoring electrode. The methods and apparatus further include measuring apparatus further including measuring the potential gradient in the vicinity of the potential montoring electrode and adjusting the potential distribution in a given region of the borehole in response to the measured potential gradient to maintain the potential gradient at a substantially fixed value. This can take the form of supplying current between said at least one current-emitting electrode and an auxiliary electrode located between said at least one current-emitting electrode and the borehole region where the potential gradient is measured. By so doing, the potential of the potential monitoring electrode should be substantially near zero volt so as to provide an accurate reference voltage to the investigating electrical circuitry.

In accordance with another feature of the invention, the potential at points on both sides of the electrode array can be maintained at approximately the fixed reference potential in response to the potential gradient in the vicinity of the potential monitoring electrode.

In acordance with another feature of the invention, apparatus for investigating earth formations comprises a plurality of electrodes adapted for movement through the borehole, the electrodes including a survey electrode for emitting survey current into the surrounding earth formation for investigation thereof, and a focusing electrode array extending mechanically outwardly a given distance on both sides of the survey electrode for emitting focusing current to maintain the survey current in a path perpendicular to the borehole axis. The apparatus further includes means for supplying signals of differing potentials to different ones of the focusing electrodes for extending the effective electrical length of the focusing electrode array outwardly beyond the given mechanical length and means for maintaining the effective electrical length of the focusing electrode array within a given maximum length. To limit the effective electrical length, a potential approximating zero volt is set up at points on opposite sides of the survey and focusing electrodes.

To acomplish this setting up of a zero potential on opposite sides of the survey and focusing electrodes as well as maintaining the potential reference electrode at a substantially fixed reference potential, the potential of a pair of shield electrodes located on opposite sides of the survey and focusing electrodes can be adjusted in response to the potential gradient measured in the vicinity of the potential reference electrode.

For a better understanding of the present invention, together with other and further objects and features thereof, reference is had to the following description taken in connection with the accompanying drawings, the scope of the invention being pointed out in the appended claims.

Referring to the drawings.

Figure 1:
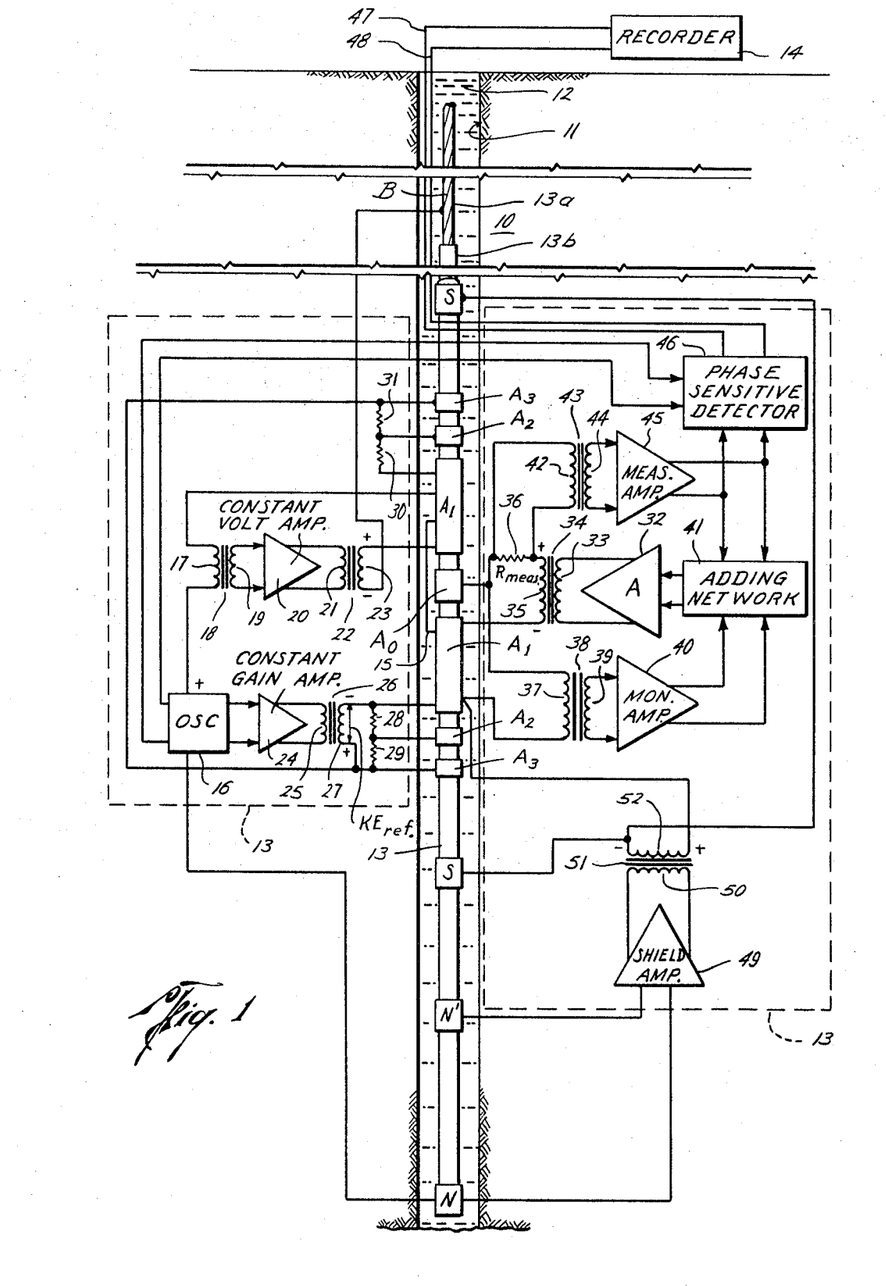
FIG. 1 illustrates an embodiment of earth formation investigating apparatus of the present invention in a borehole together with a schematic diagram of the electrical circuitry utilized with such embodiment.

Referring to FIG. 1 of the drawings, there is shown a representative embodiment of apparatus constructed in accordance with the present invention for investigating subsurface earth formations 10 traversed by a borehole 11. Borehole 11 is filled with an electrically conductive drilling fluid 12, commonly referred to as "drilling mud." The investigating apparatus includes a plurality of electrodes spaced apart in an axial direction through the borehole comprising, a current return electrode B, an upper shield electrode S, a survey and focusing electrode array located on both sides of, that is, above and below, the survey electrode $A_0$. The focusing electrode array comprises two focusing electrodes $A_1$ immediately adjacent to survey electrode $A_0$ and on opposite sides thereof and pairs of auxiliary focusing electrodes $A_2$ and $A_3$ on opposite sides of focusing electrodes $A_1$. Further electrodes include a lower shield electrode S, a potential reference monitor electrode N' and a potential reference electrode N. The investigating apparatus also includes a fluid-tight housing 13, disposed between the electrodes, which contains the downhole electrical circuitry. The dotted line enclosures 13, shown on both sides of the borehole 11, represent the fluid-tight housing 13 for the purpose of showing the electrical circuitry contained therein. The plurality of electrodes and the fluid-tight housing 13 are connected by an armored, multiconductor supporting cable 13a (only partially shown) which extends to the surface of the earth. Conductors which supply the power to the downhole circuitry and the conductors which carry the measurements to the surface are contained within this cable 13a. This cable 13a is connected to a suitable winch mechanism located at the surface of the earth which raises and lowers the downhole investigating equipment. The recorder 14 shown at the surface of the earth has associated therewith a suitable driving mechanism which is mechanically coupled to the supporting cable 13a for advancing the recording medium in step with movement of the downhole apparatus through borehole 11. The armor of the armored supporting cable 13a constitutes the current return electrode B. The lower 100 feet of the cable 13a immediately above the housing 13 is covered with electrical insulation material 13b.

Survey electrode $A_0$ emits a survey current into the earth formation surrounding the borehole for investigation thereof. The focusing electrodes $A_1$, $A_2$ and $A_3$ are adapted to emit focusing current into the earth formation surrounding the borehole for confining the survey current to a path substantially perpendicular to the borehole axis. A conductor 15 is shown connecting the two focusing electrodes $A_1$ on opposite sides of survey electrode $A_0$ together, thus maintaining equal potential on both focusing electrodes $A_1$.

The investigating apparatus further includes an oscillator 16 which provides a reference voltage to the primary winding 17 of transformer 18. The magnitude of this reference voltage is determined with respect to potential reference electrode N, which is at a distance below the survey and focusing electrode array. Thus, the voltage applied to primary winding 17 from oscillator 16 will be a fixed magnitude with respect to remote reference electrode N. The secondary winding 19 of transformer 18 is connected to constant voltage amplifier 20. The output from constant voltage amplifier 20 is supplied to the primary winding 21 of transformer 22, one side of the secondary winding 23 of which is connected to focusing electrode $A_1$. The other side of secondary winding 23 is connected to current return electrode B, which is formed by the armor of the armored multiconductor cable 13a extending to the surface of the earth.

A second output of oscillator 16 is supplied to constant gain amplifier 24, the output of which is supplied to the primary winding 25 of transformer 26. One side of the secondary winding 27 of transformer 26 is connected to auxiliary focusing electrodes $A_3$. The other side of secondary winding 27 is connected to focusing electrode $A_1$. On the bottom portion of the survey and focusing electrode array, a resistor 28 is connected between focusing electrode $A_1$ and auxiliary focusing electrode $A_2$. Resistor 29 is connected between auxiliary focusing electrodes $A_2$ and $A_3$. On the top portion of the survey and focusing electrode array, resistor 30 is connected between focusing electrode $A_1$ and auxiliary focusing electrode $A_2$ and resistor 31 is connected between auxiliary focusing electrodes $A_2$ and $A_3$. Thus, resistors 28 and 29 form a voltage dividing network between focusing electrode $A_1$ and auxiliary focusing electrodes $A_2$ and $A_3$ on the bottom portion of the survey and focusing electrode array, and resistors 30 and 31 form a voltage dividing network between focusing electrode $A_1$ and auxiliary focusing electrodes $A_2$ and $A_3$ on the top portion of the survey and focusing electrode array.

An amplifier 32 provides an output signal to the primary winding 33 of the transformer 34. One side of the secondary winding 35 of transformer 34 is connected to the focusing electrode $A_1$. The other side of secondary winding 35 is coupled through a low resistance measure resistor 36 to survey electrode $A_0$. The survey electrode $A_0$ is also connected to one side of the primary winding 37 of a transformer 38. The other side of primary winding 37 is connected to focusing electrodes $A_1$. The secondary winding 39 of transformer 38 is connected to a monitor amplifier 40. The output of monitor amplifier 40 is connected to an adding network 41, whose output is connected to the input of the amplifier 32. The primary winding 42 of a transformer 43 is connected across the measure resistor 36. The secondary winding 44 of transformer 43 is connected to the input of a measure amplifier 45, whose output is connected to the adding network 41. The output of measure amplifier 45 is also connected to a phase sensitive detector 46, whose output is connected to recorder 14 at the surface of the earth via cable conductors 47 and 48 (actually contained within cable 13a). A third output of the oscillator 16 is also connected to the phase sensitive detector 46.

Potential reference monitor electrode N' and potential reference electrode N are connected to the input of a shield amplifier 49. The output of shield amplifier 49 is connected to the primary winding 50 of a transformer 51. One side of the secondary 52 of transformer 51 is connected to focusing electrodes $A_1$. The other side of the secondary winding 52 is connected to both shield electrodes S above and below the survey and focusing electrode array.

Considering now the operation of the FIG. 1 apparatus, the potentials of survey electrode $A_0$ and focusing electrodes $A_1$ are maintained substantially equal to one another and at a constant value with respect to remote potential reference electrode N. Oscillator 16 provides a reference signal of constant voltage magnitude with respect to remote potential refrence electrode N. This constant reference voltage is supplied to one side of the primary winding 17 of transformer 18. Applied to the other side of primary winding 17 is the voltage on focusing electrodes $A_1$. A signal proportional to the potential difference between the reference voltage from oscillator 16 and the voltage on focusing electrodes $A_1$ is induced in secondary winding 19 of transformer 18 and applied to constant voltage amplifier 20. The output from constant voltage amplifier 20 is applied through transformer 22 between focusing electrodes $A_1$ and current return electrode B located on the armor of the cable 13a extending to the surface of the earth. Thus, constant voltage amplifier 20 provides sufficient current to focusing electrodes $A_1$ to maintain a substantially zero potential difference between the two sides of primary winding 17 of transformer 18, thus maintaining a voltage on focusing electrodes $A_1$ equal to the reference voltage supplied from oscillator 16.

The purpose of the circuitry comprising transformer 38, monitor amplifier 40, adding network 41, amplifier 32, transformer 34 and measure resistor 36, transformer 43, measure amplifier 45 back to adding network 41 is to provide a current to survey electrode $A_0$ of such magnitude so as to maintain a substantially zero potential difference between survey electrode $A_0$ and focusing electrodes $A_1$. The potentials on survey electrode $A_0$ and focusing electrodes $A_1$ are supplied to opposite sides of the primary winding 37 of transformer 38. A signal proportional to the potential difference between electrodes $A_0$ and $A_1$ is induced in the secondary winding 39 of transformer 38 and supplied to monitor amplifier 40. The output from monitor amplifier 40 is supplied to adding network 41 and then to amplifier 32. An output signal from amplifier 32 is induced in secondary winding 35 of transformer 34, and applied between survey electrode $A_0$, through measure resistor 36, and focusing electrode $A_1$.

Looking at the secondary winding 23 of transformer 22, the polarity markings are designated "+" on the focusing electrodes $A_1$ side of secondary winding 23. The polarity markings on the secondary winding 35 of transformer 34 give "+" for the survey electrode $A_0$ side of secondary winding 35. Thus, amplifier 32 provides an output signal to transfomer 34 in adding relationship to the signal applied to focusing electrodes $A_1$ from transformer 22, since there is some voltage drop between focusing electrodes $A_1$ and survey electrode $A_0$. Amplifier 32 provides an output signal to transformer 34 of sufficient magnitude to reduce substantially to zero the potential difference between focusing electrodes $A_1$ and survey electrode $A_0$ developed across the primary winding 37 of transformer 38. Thus, the current through measure resistor 36 is the total survey current required to maintain this potential difference substantially zero.

The current supplied to survey electrode $A_0$ sets up a voltage drop across measure resistor 36, which voltage signal is supplied to the primary winding 42 of transformer 43, induced in secondary winding 44, and supplied to measure amplifier 45. The output from measure amplifier 45 is supplied back to adding network 41, which serves to feed back to amplifier 32 the voltage drop across measure resistor 36. Adding network 41 isolates the output of monitor amplifier 40 and measure amplifier 45 from one another, while at the same time, combining the output signals from these two amplifiers to be supplied to amplifier 32.

The output signal from measure amplifier 45, which is proportional to the voltage drop developed across measure resistor 36, which is, in turn, proportional to the current supplied to survey electrode $A_0$, is also supplied to phase sensitive detector 46. Also supplied to phase sensitive detector 46 is a phase reference signal from oscillator 16. The output from phase sensitive detector 46 is supplied via cable conductors 47 and 48 to recorder 14 at the surface of the earth to provide a permanent record of the conductivity of the subsurface earth formations.

For a further explanation of the feed-back circuits associated with amplifier 32, see U. S. Patent No. 3,031,612, granted to M. F. Easterling on Apr. 24, 1962.

When investigating subsurface earth formations by the "focused" system, it is sometimes desirable to confine the survey current beam perpendicular to the axis of the borehole for substantial distances. However, under certain borehole conditions, this may require substantial physical lengths in both axial directions through the borehole for the focusing electrode array, which is undesirable because of the added mass and weight of the investigating equipment. Thus, it would be desirable to have effective electrical lengths of the focusing electrode array longer than the physical or mechanical length thereof. The "electrical length" of the focusing electrode array is the total physical or mechanical length from the survey electrode $A_0$ in one axial direction to the far end of the farthest focusing electrode from the survey electrode $A_0$, that a focusing electrode array with equal potential along its length would have to be in order to provide substantially the same degree of focusing action that the particular focusing electrode array in question provides. Thus, by increasing the potential at the end of a focusing electrode array, the effective electrical length in one axial direction will be increased because a focusing electrode array of equal potential along its length would have to be much longer than this focusing electrode array with increased potential at its end, to provide the same degree of focusing action. When speaking of the distance from the survey electrode $A_0$ on both sides thereof, the plural of length, "lengths" is used.

It is also desirable to have the effective electrical lengths of the focusing electrode array remain constant at every depth throughout the borehole. However, under severe operating conditions, as for example, when the resistivity of the subsurface earth formations surrounding the borehole is higher than the resistivity of the mud in the borehole, the current emitted from the focusing electrodes will follow the low resistance path through the drilling mud to the current return electrode, thus providing a potential approximating that of the focusing electrodes for a substantial distance beyond the physical lengths of the focusing electrode array through the drilling mud in the borehole. This, in effect, extends the effective electrical lengths of the focusing electrode array an unknown amount in both axial directions through the borehole, which, in effect, introduces an error or uncertainty into the conductivity or resistivity measurements. Therefore, it is desirable to keep the physical or mechanical lengths of the focusing electrode array short, but at the same time, to increase the effective electrical lengths of the focusing electrode array, but providing means to maintain the effective electrical lengths within a desired maximum length.

In the present embodiment, means to increase the effective electrical lengths of the focusing electrode array while, at the same time, maintaining the mechanical lengths short comprises constant gain amplifier 24, transformer 26, resistors 28, 29, 30 and 31, and auxiliary focusing electrodes $A_2$ and $A_3$. Potential reference oscillator 16 provides a fixed portion of the reference voltage to constant gain amplifier 24. The output signal from constant gain amplifier 24, which is applied to transformer 26 induces a voltage of fixed magnitude in the secondary 27 thereof. This fixed magnitude voltage is designated "$K \cdot E_{ref}$." The voltage induced across the secondary winding 27 of transformer 26 is in adding relationship to the voltage induced across the secondary 23 of transformer 22. Thus, the voltage applied to auxiliary focusing electrodes $A_3$ from the secondary winding 27 of transformer 26 has a voltage $K \cdot E_{ref}$ higher than the voltage $E_{ref}$ which is applied to focusing electrodes $A_1$ from the secondary winding 23 of transformer 22. Thus, the total voltage applied to auxiliary focusing electrodes $A_3$ is $E_{ref} + K \cdot E_{ref}$. The voltage applied to auxiliary focusing electrodes $A_2$ has a magnitude dependent on the voltage dividing network comprising resistors 28 and 29 for the lower auxiliary focusing electrode $A_2$ and resistors 30 and 31 for the upper auxiliary focusing electrode $A_2$. The particular voltages desired for auxiliary focusing electrodes $A_2$ with respect to auxiliary focusing electrodes $A_3$ and focusing electrodes $A_1$ can be adjusted by adjusting the values of resistors 28, 29, 30 and 31.

Thus, it can be seen that the voltages on auxiliary focusing electrodes $A_2$ are somewhat higher than the voltage on focusing electrodes $A_1$ and the voltage on auxiliary focusing electrodes $A_3$ is somewhat higher than the voltages on auxiliary focusing electrodes $A_2$. Thus, the voltage on either side of survey electrode $A_0$ increases as the distance from survey electrode $A_0$ increases. This increase of voltage on either side of focusing electrodes $A_1$ has the same effect as if the focusing electrodes $A_1$ were physically or mechanically extended outwardly from survey electrode $A_0$ a much greater distance than auxiliary focusing electrodes $A_3$ are physically from survey electrode $A_0$ in the FIG. 1 embodiment. This, in effect, increases the effective electrical lengths of the focusing electrodes while, at the same time, maintaining the physical or mechanical lengths of the focusing electrodes short compared with the effective electrical lengths.

Figure 2:
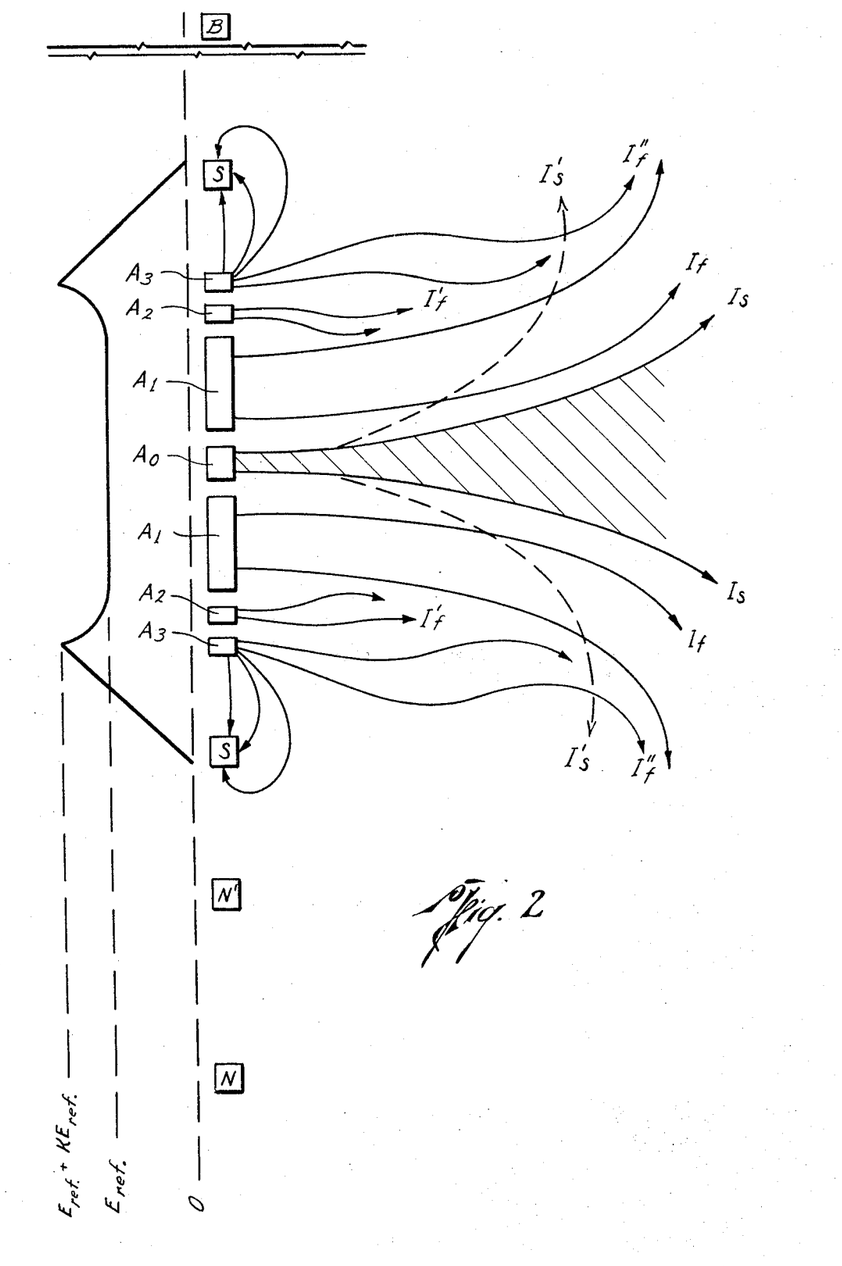
FIG. 2 illustrates, in a graphical manner, both the electrical potential in the surrounding earth formations at a short distance from the electrodes and a typical current flow pattern for the electrode system of FIG. 1.

Looking now at FIG. 2 of the drawings, there is shown the electrodes of the FIG. 1 apparatus disposed in the borehole. On the left side of the electrodes, there is shown a plot of the voltage taken along a vertical line just in front of the electrodes and equal distance from each electrode. It can be seen that the voltage in front of survey electrode $A_0$ and focusing electrode $A_1$ located on either side of survey electrode $A_0$, are at the reference voltage $E_{ref}$. The voltage in front of auxiliary focusing electrodes $A_2$ on either side of focusing electrodes $A_1$ begins increasing and the voltage in front of auxiliary focusing electrodes $A_3$ on either side of electrodes $A_2$ increases upwardly to a maximum voltage of $E_{ref} + K \cdot E_{ref}$.

Looking now at the right-hand side of the electrodes of FIG. 2, there is shown a plot of the current flow lines emitting from the survey and focusing electrodes array. Such currents are actually emitted all the way around the circumferences of the electrodes but, for purposes of explanation in FIG. 2, are shown as being emitted only from the right side of the electrodes. The survey electrode $A_0$ emits survey current $I_s$ into the earth formations surrounding the borehole. The survey current $I_s$ is confined to a path substantially perpendicular to the axis of the borehole for a substantial distance outwardly from the borehole by the focusing current $I_f$ emitted from focusing electrodes $A_1$. Auxiliary focusing electrodes $A_2$ and $A_3$ emit focusing current $I_f'$ and $I_f''$ respectively. Because of the higher potential of auxiliary focusing electrodes $A_2$ and $A_3$, the current emitted therefrom tends to converge toward the survey current beam at a distance from the borehole. The focusing current $I_f$ emitted from focusing electrodes $A_1$ tends to shield the survey current beam $I_s$ from the current emitted from auxiliary focusing electrodes $A_2$ and $A_3$ within a distance relatively close to the borehole. However, at greater distances from the borehole, the auxiliary focusing currents $I_f'$ and $I_f''$ emitted from auxiliary focusing electrodes $A_2$ and $A_3$ confines the survey current beam to a path substantially perpendicular to the borehole. The dotted line representation $I_s'$ of the survey current shows the path that the survey current beam might take if the focusing electrodes $A_1$ with equal potential along their lengths were extended outwardly from survey electrode $A_0$ on both sides thereof the same distance that auxiliary focusing electrodes $A_3$ are from the survey electrode $A_0$. Thus, it can be seen that by placing higher potentials on auxiliary focusing electrodes $A_2$ and $A_3$, the effective electrical lengths of the focusing electrode array is extended while, at the same time, the physical or mechanical lengths of the focusing electrode array is maintained a relatively short distance from the survey electrode $A_0$.

While extending the effective electrical lengths of the focusing electrode array, it is also desirable to maintain the effective lectrical lengths within substantially constant maximum lengths to provide more accurate resistivity or conductivity readings At the same time, it is also desirable to maintain the potential gradient in the vicinity of the potential reference electrode N at a substantially zero value. The means in FIG. 1 comprising poential reference electrode N, potential reference monitor electrode N', shield amplifier 49, transformer 51 and shield electrodes S on either side of the survey and focusing electrode array accomplish this result. Shield amplifier 49 monitors the difference in potential between potential reference electrode N and potential reference monitor electrode N' and provides an output signal to the primary winding 50 of transformer 51, which signal is representative of that difference in potential. The magnitude and polarity of the voltage induced into the secondary winding 52 of transformer 51 are such as to reduce substantially to zero the difference in potential between the potential reference electrode N and the potential reference monitor electrode N'. Thus, shield electrodes S on either side of the survey and focusing electrode array have a signal applied to them such as to maintain a substantially zero potential difference between potential reference electrode N and potential reference monitor electrode N'. Thus, since potential reference electrode N is substantially free of potential gradient set up by the other electrodes of the investigating apparatus, a substantially consant reference potential of approximaely zero volt is supplied to oscillator 16, so that the reference voltage supplied to the survey and focusing electrodes can have a known constant value.

The voltage applied to shield electrodes S will also be at approximately zero potential, but this may vary slightly as the voltage gradient in the vicinity of the potential reference elecrode N requires. However, since shield electrodes S are at nearly zero potential, this insures that the effective electrical lengths of the focusing electrode array will not extend beyond the location of shield electrode S. It can be seen that the same electrical circuitry is utilized to accomplish two different results; that is, limiting the effective electrical lengths of the focusing electrode array to desired maximum lengths and reducing the potential gradient in the vicinity of the potential reference electrode N to a minimum.

Referring again to FIG. 2 of the drawings, it can be seen from the voltage plot on the left side of the electrodes that the voltage extends from a maximum voltage of $E_{ref}+K \cdot E_{ref}$ opposite the auxiliary focusing electrodes $A_3$ to a voltage of zero opposite the shield electrodes S. Looking at the current flow lines on the right side of the electrodes of FIG. 2, it can be seen that the current will tend to return to the shield electrodes S and, thus, will not flow in the vicinity of the potential reference electrode N, leaving N free of voltage gradients set up by the other electrodes of the investigating apparatus.

Therefore, the apparatus shown in FIG. 1 of the drawings increases the effective electrical lengths of the focusing electrode array in both axial directions from the survey electrode $A_0$, while the physical or mechanical lengths of the focusing electrode array are kept at a minimum. At the same time, the effective electrical lengths of the focusing electrode array are maintained within maximum desired lengths from both sides of the survey electrode $A_0$, and the voltage gradient in the vicinity of the potential reference electrode N is maintained at a minimum by utilizing the same equipment.

While there has eben described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole, comprising:
    (a) a support means carrying a plurality of electrodes and adapted for movement through the borehole, the electrodes including:
        (1) an electrode array having at least one electrode adapted to emit current into the surrounding earth formations;
        (2) a potential reference electrode spaced apart from the electrode array for providing a reference potential; and
        (3) a shield electrode spaced apart from said electrode array;
    (b) means responsive to the reference potential for supplying current to said at least one electrode to provide a measure of a characteristic of the formations; and
    (c) means for measuring the potential gradient in the vicinity of the potential reference electrode and supplying a potential to the shield electrode in response to the measured potential gradient said supplied potential being of sufficient magnitude to maintain the potential reference electrode at a substantially fixed reference potential.

2. Apparatus for investigating earth formations traversed by a borehole, comprising:
    (a) a support means carrying a plurality of electrodes and adapted for movement through the borehole, the electrodes including:
        (1) an electrode array having at least one electrode adapted to emit current into the surrounding earth formations;
        (2) a potential reference electrode spaced apart from the electrode array for providing a reference potential; and
        (3) shield electrodes located on opposite sides of the electrode array;
    (b) means responsive to the reference potential for supplying current to said at least one electrode to provide a measure of a characteristic of the formations; and
    (c) means for measuring the potential gradient in the vicinity of the potential reference electrode and supplying a potential to the shield electrodes in response to the measured potential gradient, said supplied potential being of sufficient magnitude to maintain the potential reference electrode at a substantaiily fixed reference potential and the potential at points on both sides of the electrode array at approximately the fixed reference potential.

3. Apparatus for investigating earth formations traversed by a borehole, comprising:
    (a) a support means carrying a plurality of electrodes and adapted for movement through the borehole, the electrodes including:
(1) an electrode array having at least one electrode adapted to emit current into the surrounding earth formations;
(2) a potential reference electrode for providing a reference potential; and
(3) two shield electrodes located in close proximity to the electrode array on opposite sides thereof, one of the shield electrodes located between the electrode array and the potential reference electrode;

(b) means responsive to the reference potential for supplying current to said at least one electrode to provide a measure of a characteristic of the formations;

(c) means for measuring the potential gradient in the vicinity of the potential reference electrode; and (d) means responsive to the measured potential gradient for supplying a signal to the shield electrodes of sufficient magnitude to maintain the potential reference electrode at a substantially fixed reference potential and the potential at points on both sides of the electrode array at approximately the fixed reference potential.

4. Apparatus for investigating earth formations traversed by a borehole, comprising:
(a) a support means carrying a plurality of electrodes and adapted for movement through the borehole, the electrodes including:
(1) an electrode array having at least one electrode adapted to emit current into the surrounding earth formations;
(2) a potential reference electrode for providing a reference potential;
(3) a potential reference monitor electrode located between the potential reference electrode and the electrode array; and
(4) two shield electrodes located in close proximity of the electrode array on opposite sides thereof, one of the shield electrodes located between the potential reference monitor electrode and the electrode array;

(b) means responsive to the reference potential for supplying current to said at least one electrode to provide a measure of a characteristic of the formations; and (c) means for supplying a signal to the shield electrodes in response to the difference in potential between the potential reference electrode and the potential reference monitor electrode for maintaining the potential reference electrode at a substantially fixed reference potential and, at the same time, maintaining the potential at points on both sides of the electrode array at approximately the fixed reference potential.

5. Apparatus for investigating earth formations traversed by a borehole, comprising:
(a) a support means carrying a plurality of electrodes and adapted for movement through the borehole, the electrodes including:
(1) an electrode array having at least one electrode adapted to emit current into the surrounding earth formations;
(2) a potential reference electrode for providing a reference potential;
(3) a potential reference monitor electrode located between the potential reference electrode and the array; and
(4) two shield electrodes located in close proximity of the electrode array on opposite sides thereof, one of the shield electrodes located between the potential reference monitor electrode and the electrode array;

(b) means responsive to the reference potential for supplying current to said at least one electrode to provide a measure of a characteristic of the formations; and (c) means for supplying a signal between the shield electrodes and an electrode of the electrode array in response to the difference in potential between the potential reference electrode and the potential reference monitor electrode for maintaining the potential reference electrode at a substantially fixed reference potential and, at the same time, maintaining the potential at points equal distance on both sides of the electrode array at approximately the fixed reference potential.

6. Apparatus for investigating earth formations traversed by a borehole, comprising:
(a) a support means carrying a plurality of electrodes and adapted for movement through the borehole, the electrodes including:
(1) an electrode array having at least one electrode adapted to emit current into the surrounding earth formations;
(2) a potential reference electrode for providing a reference potential;
(3) a potential reference monitor electrode located between the potential reference electrode and the electrode array; and
(4) two shield electrodes located in close proximity of the electrode array on opposite sides thereof, one of the shield electrodes located between the potential reference monitor electrode and the electrode array;

(b) means responsive to the reference potential for supplying current to said at least one electrode to provide a measure of a characteristic of the formations;

(c) potential monitor means coupled to the potential reference electrode and the potential reference monitor electrode for providing an output signal indicative of the difference in potential between the potential reference and potential reference monitor electrodes; and (d) means responsive to said output signal for supplying a signal to the shield electrodes of such polarity and magnitude to maintain the shield electrodes at approximately the fixed reference potential so that the potential reference electrode may be maintained at the substantially fixed reference potential and, at the same time, points equal distance on both sides of the electrode array may be maintained at approximately the fixed reference potential.

7. Apparatus for investigating earth formations traversed by a borehole, comprising:
(a) a support means carrying a plurality of electrodes and adapted for movement through the borehole, the electrodes including:
(1) a survey electrode for emitting survey current into the surrounding earth formations for investigation thereof;
(2) a focusing electrode array extending mechanically outwardly a given distance on both sides of the survey electrode for emitting focusing current to maintain the survey current in a path perpendicular to the borehole axis;
(3) a shield electrode located a given distance from the survey electrode and focusing electrode array; and
(4) a current return electrode located a given distance from the survey, focusing, and shield electrodes;

(b) means for supplying current to the survey and focusing electrodes for investigation of the formations, the current being returned from the current return electrode to the current supplying means; and (c) means coupled between the shield electrode and at least one electrode of the focusing electrode array for maintaining the potential of the shield electrode sufficiently less than the potential of said at least one focusing electrode to maintain the effective electrical length of the focusing electrode array within a given maximum length.

8. Apparatus for investigating earth formations traversed by a borehole, comprising:
   (a) a support means carrying a plurality of electrodes and adapted for movement through the borehole, the electrodes including:
      (1) a survey electrode for emitting survey current into the surrounding earth formations for investigation thereof;
      (2) a focusing electrode array extending mechanically outwardly a given distance on both sides of the survey electrode for emitting focusing current to maintain the survey current in a path perpendicular to the borehole axis;
      (3) shield electrodes located on opposite sides of the survey electrode and focusing electrode array; and
      (4) a current return electrode located at a given distance from the survey, focusing, and shield electrodes;
   (b) means for supplying current to the survey and focusing electrodes for investigation of the formations, the current being returned from the current return electrode to the current supplying means; and
   (c) means coupled between the shield electrodes and at least one electrode of the focusing electrode array for maintaining the potential of the shield electrodes sufficiently less than the potential of said at least one focusing electrode to maintain the effective electrical lengths of the focusing electrode array within given maximum lengths on both sides of the survey electrode.

9. Apparatus for investigating earth formations traversed by a borehole, comprising:
   (a) a support means carrying a plurality of electrodes and adapted for movement through the borehole, the electrodes including:
      (1) a survey electrode for emitting survey current into the surrounding earth formations for investigation thereof;
      (2) a focusing electrode array extending mechanically outwardly a given distance on both sides of the survey electrode for emitting focusing current to maintain the survey current in a path perpendicular to the borehole axis; and
      (3) a shield electrode spaced apart from the survey and focusing electrodes;
   (b) means for supplying signals of different potentials to different focusing electrodes of the focusing electrode array to extend the effective electrical length of the focusing electrode array outwardly beyond the given mechanical length; and
   (c) means coupled between the shield electrode and at least one focusing electrode for substantially maintaining the shield electrode at a given potential with respect to the potential of said at least one focusing electrode so as to maintain the effective electrical length of the focusing electrode array within a given maximum length.

10. Apparatus for investigating earth formations traversed by a borehole, comprising:
    (a) a support means carrying a plurality of electrodes aligned in an axial direction through the borehole and adapted for movement through the borehole, the electrodes including:
       (1) a survey electrode for emitting survey current into the surrounding earth formations for investigation thereof;
       (2) a focusing electrode array extending mechanically outwardly a given distance on both sides of the survey electrode for emitting focusing current to maintain the survey current in a path perpendicular to the borehole axis; and
       (3) shield electrodes located on opposite sides of the survey and focusing electrodes;
    (b) means for supplying signals of different potentials to different focusing electrodes of the focusing electrode array to extend the effective electrical lengths of the focusing electrode array axially outwardly in both directions from the survey electrode beyond the given mechanical lengths; and
    (c) means coupled between the shield electrodes and at least one focusing electrode for substantially maintaining the shield electrodes at a given potential with respect to said at least one focusing electrode so as to maintain the effective electrical lengths of the focusing electrode array within given maximum lengths on both sides of the survey electrode.

11. Apparatus for investigating earth formations traversed by a borehole, comprising:
    (a) a support means carrying a plurality of electrodes and adapted for movement through the borehole, the electrodes including:
       (1) a survey electrode for emitting survey current into the surrounding earth formations for investigation thereof;
       (2) a focusing electrode array extending mechanically outwardly a given distance on both sides of the survey electrode for emitting focusing current to maintain the survey current in a path perpendicular to the borehole axis; and
       (3) a potential reference electrode for providing a reference potential;
    (b) means responsive to the reference potential for supplying current to said at least one electrode to provide a measure of a characteristic of the formation;
    (c) means for applying signals or different potentials to different focusing electrodes of the focusing electrode array to extend the effective electrical length of the focusing electrode array outwardly beyond the given mechanical length; and
    (d) means responsive to the potential gradient in the vicinity of the potential reference electrode for adjusting the potential distribution in the borehole to maintain the effective electrical length of the focusing electrode array within a given maximum length and the potential reference electrode at a substantially fixed reference potential.

12. Apparatus for investigating earth formation traversed by a borehole, comprising:
    (a) a support means carrying a plurality of electrodes and adapted for movement through the borehole, the electrodes including:
       (1) a survey electrode for emitting survey current into the surrounding earth formations for investigation thereof;
       (2) a focusing electrode array extending mechanically outwardly a given distance on both sides of survey electrode for emitting focusing current to maintain the survey current in a path perpendicular to the borehole axis;
       (3) a potential reference electrode for providing a reference potential; and
       (4) two shield electrodes located on opposite sides of the survey and focusing electrode array;
    (b) means responsive to the reference potential for supplying current to said at least one electrode to provide a measure of a characteristic of the formation;
    (c) means for supplying signals of different potentials to different focusing electrodes of the focusing electrode array for extending the effective electrical length of the focusing electrode array outwardly beyond the given mechanical length; and
    (d) means responsive to the potential gradient in the vicinity of the potential reference electrode for supplying a potential to the shield electrodes of sufficient magnitude to maintain the effective electrical length of the focusing electrode array within a given maximum length and the potential reference electrode at a substantially fixed reference potential.

13. Apparatus for investigating earth formations traversed by a borehole, comprising:
   (a) a support means carrying a plurality of electrodes aligned in an axial direction through the borehole and adapted for movement through the borehole, the electrodes including:
      (1) a survey electrode for emitting survey current into the surrounding earth formations for investigation thereof;
      (2) a focusing electrode array extending mechanically outwardly a given distance on both sides of the survey electrode for emitting focusing current to maintain the survey current in a path perpendicular to the borehole axis; and
      (3) shield electrodes located on both sides of the survey and focusing electrodes;
   (b) means for supplying signals of increased potential to different electrodes of the focusing electrode array at axial points through the borehole at given distances from the survey electrode; and
   (c) means coupled between the shield electrodes and at least one focusing electrode for maintaining a fixed reference potential with respect to the focusing electrode potential at axial points through the borehole on both sides of the survey and focusing electrode array.

14. Apparatus for investigating earth formations traversed by a borehole, comprising:
   (a) a plurality of electrodes aligned in an axial direction through the borehole and adapted for movement through the borehole, the electrodes including:
      (1) a survey electrode for emitting survey current into the surrounding earth formations for investigation thereof;
      (2) a focusing electrode array extending mechanically outwardly a given distance on both sides of the survey electrode for emitting focusing current to maintain the survey current in a path perpendicular to the borehole axis;
      (3) a potential reference electrode; and
      (4) a potential reference monitor electrode located intermediate the potential reference electrode and the focusing electrode array;
   (b) means coupled to at least two focusing electrodes of the focusing electrode array for increasing the potential of the focusing electrode array at axial points through the borehole at a distance from the survey electrode; and
   (c) means responsive to the difference in potential between the potential reference electrode and the potential reference monitor electrode for maintaining a substantially fixed reference potential on the potential reference electrode, and, at the same time, maintaining approximately the fixed reference potential at an axial point through the borehole at a given distance from the survey and focusing electrode array.

15. A method of investigating earth formations traversed by a borehole comprising the steps of:
   moving an electrode array through the borehole;
   emitting survey current from a survey electrode of the electrode array for investigating earth formations surrounding the borehole;
   emitting focusing current from a focusing electrode array of the electrode array, the focusing electrode array located on opposite sides of the survey electrode;
   monitoring the potential gradient in the vicinity of a potential reference electrode disposed in the borehole;
   maintaining approximately a fixed reference potential at points on opposite sides of the electrode array in response to the potential gradient in the vicinity of the potential reference electrode; and
   maintaining the potential reference electrode at a substantially fixed reference potential in response to the potential gradient in the vicinity of the potential reference electrode.

16. A method of investigating earth formations traversed by a borehole comprising the steps of:
   moving an electrode array through the borehole;
   emitting survey current from a survey electrode of the electrode array for investigating earth formations surrounding the borehole;
   emitting focusing current from a focusing electrode array of the electrode array, the focusing electrode array located on opposite sides of the survey electrode;
   monitoring the potential gradient in the vicinity of a potential reference electrode disposed in the borehole; and
   maintaining approximately a fixed reference potential at points on opposite sides of the electrode array in response to the potential gradient in the vicinity of the potential reference electrode.

17. Apparatus for investigating earth formations traversed by a borehole, comprising:
   (a) a support means carrying a plurality of electrodes and adapted for movement through the borehole, the electrodes including:
      (1) an electrode array having at least one electrode adapted to emit current into the surrounding earth formations;
      (2) a potential reference electrode for providing a reference potential; and
      (3) two shield electrodes, one of which is located between the electrode array and the potential reference electrode;
   (b) means responsive to the reference potential for supplying current to said at least one current-emitting electrode to provide a measure of a characteristic of the formations; and
   (c) means for measuring the potential gradient in the vicinity of the potential reference electrode and supplying a potential to the shield electrodes in response to the measured potential gradient, said supplied potential being of sufficient magnitude to maintain the potential at points on both sides of the electrode array at approximately the reference potential.

18. Apparatus for investigating earth formations traversed by a borehole, the apparatus of the type where a remote potential reference electrode is connected to investigating electrical circuitry to provide a reference potential approximating zero volt, comprising:
   (a) a support means carrying a plurality of electrodes and adapted for movement through the borehole, the electrodes including:
      (1) a current-emitting electrode array having at least one electrode adapted to emit current into the surrounding earth fotrmation; and
      (2) the remote potential reference electrode;
   (b) investigating electrical circuit means coupled to an electrode of said current-emitting electrode array and said potential reference electrode for providing a measure of an electrical characteristic of an earth formation; and
   (c) means for measuring the potential gradient in the vicinity of the potential reference electrode and adjusting the potential at a point in the borehole spaced apart from said current-emitting electrode array in response to the measured potential gradient to maintain the potential reference electrode at a substantially fixed reference potential so that the investigating electrical circuitry will have an accurate reference potential with which to obtain an accurate measure of the electrical characteristics of an earth formation.

19. Apparatus for investigating earth formations traversed by a borehole, the apparatus of the type where a remote potential reference electrode is connected to investigating electrical circuitry to provide a reference potential approximating zero volt, comprising:
  (a) a support means carrying a plurality of electrodes and adapted for movement through the borehole, the electrodes including:
    (1) a current-emitting electrode array having at least one electrode adapted to emit current into the surrounding earth formations;
    (2) the remote potential reference electrode; and
    (3) a shield electrode spaced apart from the electrode array;
  (b) investigating electrical circuit means coupled to an electrode of said current-emitting electrode array and said potential reference electrode for providing a measure of an electrical characteristic of an earth formation; and
  (c) means coupled to the shield electrode and responsive to the potential gradient in the vicinity of the potential reference electrode for supplying a voltage to the shield electrode of sufficient magnitude to reduce the current flow in the vicinity of the potential reference electrode substantially to zero so that the investigating electrical circuitry will have an accurate reference potential with which to obtain an accurate measure of the electrical characteristic of an earth formation.

20. Apparatus for investigating earth formations traversed by a borehole, the apparatus of the type where a remote potential reference electrode is connected to investigating electrical circuitry to provide a reference potential approximating zero volt, comprising:
  (a) a support means carrying a plurality of electrodes and adapted for movement through the borehole, the electrodes including:
    (1) a current-emitting electrode array having at least one electrode adapted to emit current into the surrounding earth formations;
    (2) the remote potential reference electrode; and
    (3) a potential reference monitor electrode located near the potential reference electrode;
  (b) investigating electrical circuit means coupled to an electrode of said current-emitting electrode array and said potential reference electrode for providing a measure of an electrical characteristic of an earth formation; and
  (c) means responsive to the potential difference between the potential reference monitor electrode and the potential reference electrode for adjusting the potential distribution in the borehole to maintain the potential reference electrode at a substantially fixed reference potential so that the investigating electrical circuitry will have an accurate reference potential with which to obtain an accurate measure of the electrical characteristics of an earth formation.

21. Apparatus for investigating earth formations traversed by a borehole, the apparatus of the type where a remote potential reference electrode is connected to the investigating electrical circuitry to provide a reference potential approximating zero volt, comprising:
  (a) a support means carrying a plurality of electrodes and adapted for movement through the borehole, the electrodes including:
    (1) a current-emitting electrode array having at least one electrode adapted to emit current into the surrounding earth formations;
    (2) the remote potential reference electrode;
    (3) a shield electrode spaced apart from the current-emitting electrode array; and
    (4) a potential reference monitor electrode located between the electrode array and the remote potential reference electrode;
  (b) investigating electrical circuit means coupled to an electrode of said current-emitting electrode array and said potential reference electrode for providing a measure of an electrical characteristic of an earth formation; and
  (c) means coupled to the shield electrode and responsive to the potential difference between the potential reference monitor electrode and the potential reference electrode for supplying a signal to the shield electrode of sufficient magnitude to reduce the current flow in the vicinity of the potential reference electrode substantially to zero so that the investigating electrical circuitry will have an accurate reference potential with which to obtain an accurate measure of the electrical characteristics of an earth formation.

22. Apparatus for investigating earth formations traversed by a borehole, the apparatus of the type where a remote potential reference electrode is connected to investigating electrical circuitry to provide a reference potential approximating zero volt, comprising:
  (a) a plurality of electrodes adapted for movement through the borehole, the electrodes including:
    (1) a current-emitting electrode array having at least one electrode adapted to emit current into the surrounding earth formations;
    (2) the remote potential reference electrode;
    (3) a shield electrode located intermediate said current-emitting electrode array and the potential reference electrode; and
    (4) a potential reference monitor electrode located intermediate the shield electrode and the potential reference electrode;
  (b) investigating electrical circuit means coupled to an electrode of said current-emitting electrode array and said potential reference electrode for providing a measure of an electrical characteristic of an earth formation;
  (c) means responsive to the potential difference between the potential reference monitor electrode and the potential reference electrode for supplying a signal indicative of the potential difference; and
  (d) means responsive to said potential difference signal for supplying a voltage between the shield electrode and at least one electrode of said current-emitting electrode array of sufficient magnitude to reduce the current flow in the vicinity of the potential reference electrode substantially to zero so that the investigating electrical circuitry will have an accurate reference potential with which to obtain an accurate measure of the electrical characteristics of an earth formation.

23. A method of investigating earth formations traversed by a borehole comprising the steps of:
  moving a plurality of electrodes through the borehole, the electrodes including a current-emitting electrode array having at least one electrode adapted to emit current into the surrounding earth formations and a remote potential reference electrode for providing a reference potential approximating zero volt;
  monitoring the potential gradient in the vicinity of the potential reference electrode;
  adjusting the potential at a point in the borehole spaced apart from said current-emitting electrode array in response to the monitored potential gradient to maintain the potential reference electrode at a substantially fixed reference potential; and
  measuring the current emitted from at least one current-emitting electrode of said electrode array to provide a measure of a formation characteristic.

24. Apparatus for investigating earth formations traversed by a borehole, comprising:
  a support means carrying a plurality of electrodes and adapted for movement through a borehole, the electrodes including a current-emitting electrode array having at least one current-emitting electrode, a pair of potential monitoring electrodes, and a pair of auxiliary electrodes symmetrically arranged relative to one of said current-emitting electrodes, one of said auxiliary electrodes located between said current-emitting electrode array and said monitoring electrode pair;

means for supplying survey current to at least one of said current-emitting electrodes for emission into a surrounding earth formation to obtain a measurement of a formation characteristic;

means for measuring the difference between the potentials on said potential monitoring electrodes; and means responsive to said measured potential difference for supplying current between at least one of said current-emitting electrodes and said auxiliary electrode to maintain said potential difference at a substantially fixed value.

25. Apparatus for investigating earth formations traversed by a borehole, comprising:

a support means carrying a plurality of electrodes and adapted for movement through a borehole, the electrodes including a current-emitting electrode array having at least one current-emitting electrode, a pair of potential monitoring electrodes, and an auxiliary electrode located between said current-emitting electrode array and said monitoring electrode pair;

means for supplying survey current to at least one of said current-emitting electrodes for emission into a surrounding earth formation;

means for measuring the difference between the potentials on said potential monitoring electrodes;

means responsive to said measured potential difference for supplying current between at least one of said current-emitting electrodes and said auxiliary electrode to maintain said potential difference at a substantially fixed value; and means for measuring the emitted survey current to obtain a measure of a formation characteristic.

26. Apparatus for investigating earth formations traversed by a borehole, comprising:

a support means carrying a plurality of electrodes and adapted for movement through a borehole, the electrodes including a current-emitting electrode array having at least one current-emitting electrode, a pair of potential monitoring electrodes, and an auxiliary electrode located between said current-emitting electrode array and said monitoring electrode pair;

means for measuring the difference between the potentials on an electrode of said current-emitting electrode array and the potential at a borehole location within the space defined by the potential monitoring electrodes to provide a first potential difference signal;

means responsive to said first potential difference signal for supplying to at least one of said current-emitting electrodes for obtaining a measure of a formation chracteristic;

means for measuring the difference between the potentials on said potential monitoring electrodes to provide a second potential difference signal; and means responsive to said second potential difference signal for supplying current between at least one of said current-emitting electrodes and said auxiliary electrode to maintain said potential difference at a substantially fixed value.

27. A method of investigating earth formations traversed by a borehole, comprising:

moving a plurality of electrodes through a borehole;
emitting first and second currents from at least one current-emitting electrode;

measuring the potential gradient at a given region in a borehole;

adjusting one of said first or second currents to maintain said measured potential gradient at a substantially fixed level, at least a portion of said adjusted current being returned to a point between said at least one current-emitting electrode and said given borehole region to thereby substantially regulate the current flow in said given borehole region; and measuring the other of said first or second currents to obtain a measure of a formation characteristic.

28. Apparatus for investigating earth formations traversed by a borehole, comprising:

a support means carrying a plurality of electrodes and adapted for movement through a borehole, the electrodes including a current-emitting electrode array having at least a central current-emitting electrode, two pairs of potential monitoring electrodes, one each located on opposite sides of said central electrode, and an auxiliary electrode located between said central current-emitting electrode and each of said monitoring electrode pairs;

means for supplying survey current to said central current-emitting electrode for obtaining a measure of a formation characteristic, all of said survey current being emitted from said central electrode;

means for measuring the potential difference between the potentials on said potential monitoring electrodes; and means responsive to said measured potential difference for supplying current between at least one of said current-emitting electrodes and said auxiliary electrodes to maintain said potential difference at a substantially fixed value.

29. A method of investigating earth formations traversed by a borehole, comprising:

moving a plurality of electrodes through a borehole;
emitting first and second curents from at least one current-emitting electrode;
measuring the potential gradient at a given region in a borehole;
adjusting one of said first or second curents to maintain said measured potential gradient at a substantially fixed level, at least a portion of said adjusted current being returned to a point between said at least one current-emitting electrode and said given borehole region to thereby substantially regulate current flow in said given borehole region;
adjusting the other of said first or second currents in response to the difference between a potential approximating the potential on said at least one current-emitting electrode and a potential existing in said given borehole region; and
measuring said adjusted other current to provide an indication of a formation characteristic.

References Cited

UNITED STATES PATENTS

| | | | |
|---|---|---|---|
| 3,096,477 | 7/1963 | Smith et al. | 324—1 |
| 3,103,626 | 9/1963 | Burton et al. | 324—10 XR |
| 3,262,050 | 7/1966 | Threadgold et al. | 324—10 |
| 3,337,794 | 8/1967 | Janssen | 324—10 |
| 2,712,631 | 7/1955 | Ferre | 324—10 XR |

RUDOLPH V. ROLINEC, *Primary Examiner.*

G. R. STRECKER, *Assistant Examiner.*

Disclaimer 3,452,269.—*Wilbur C. Welz*, Houston, Tex. METHODS AND APPARATUS FOR INVESTIGATING EARTH FORMATIONS INCLUDING ADJUSTING THE POTENTIAL DISTRIBUTION IN AN AXIAL DIRECTION THROUGH A BOREHOLE. Patent dated June 24, 1969. Disclaimer filed Oct. 11, 1973, by the assignee, *Schlumberger Technology Corporation*.

Hereby enters this disclaimer to claim 28 of said patent.

[*Official Gazette December 25, 1973.*]